United States Patent
Frank

(10) Patent No.: US 8,530,838 B2
(45) Date of Patent: Sep. 10, 2013

(54) RADIATION DETECTION SYSTEM AND METHOD OF INDICATING PRESENCE OF RADIATION

(75) Inventor: John M. Frank, Hartville, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 231 days.

(21) Appl. No.: 12/975,106

(22) Filed: Dec. 21, 2010

(65) Prior Publication Data
US 2011/0155909 A1    Jun. 30, 2011

Related U.S. Application Data

(60) Provisional application No. 61/290,681, filed on Dec. 29, 2009.

(51) Int. Cl.
*G01J 1/00* (2006.01)
*G01J 1/42* (2006.01)
*G01J 5/02* (2006.01)

(52) U.S. Cl.
USPC .................. 250/336.1; 250/395; 250/342

(58) Field of Classification Search
USPC .................. 250/336.1, 395, 388, 367
See application file for complete search history.

(56) References Cited

U.S. PATENT DOCUMENTS

| | | | |
|---|---|---|---|
| 4,081,682 A * | 3/1978 | Ohlenschlager et al. | 250/362 |
| 4,889,991 A * | 12/1989 | Ramsey et al. | 250/336.1 |
| 5,231,288 A | 7/1993 | Odell | |
| 5,379,352 A | 1/1995 | Sirat et al. | |
| 5,596,195 A | 1/1997 | Obori et al. | |
| 6,295,514 B1 | 9/2001 | Agrafiotis et al. | |
| 6,584,413 B1 | 6/2003 | Keenan et al. | |
| 6,675,106 B1 | 1/2004 | Keenan et al. | |
| 6,897,448 B2 * | 5/2005 | Smith et al. | 250/367 |
| 7,152,002 B2 | 12/2006 | Lingren et al. | |

* cited by examiner

*Primary Examiner* — David Porta
*Assistant Examiner* — Faye Boosalis
(74) *Attorney, Agent, or Firm* — Abel Law Group, LLP; Robert N. Young

(57) ABSTRACT

A radiation detection system can include a radiation detector to detect radiation and an audio output device to produce audible sounds. The detected radiation can correspond to radiation information including energy information and energy intensity information. In an embodiment, the audio output device can produce an audio spectrum in a scanning mode, and in another embodiment, the audio output device can produce sounds at corresponding sound repetition rates depending on the energy intensity of the detected radiation. A method of using a radiation detection system can include placing an object near a radiation detector, generating a radiation signal corresponding to radiation emitting from the object, and analyzing the radiation signal to generate radiation information including energy information and energy intensity information. The method can also include filtering the radiation information to produce filtered radiation information, and outputting sounds corresponding to the filtered radiation information.

20 Claims, 11 Drawing Sheets

RADIATION DETECTION SYSTEM AND METHOD OF INDICATING PRESENCE OF RADIATION

CROSS-REFERENCE TO RELATED APPLICATION

This application claims priority under 35 U.S.C. §119(e) to U.S. Patent Application No. 61/290,681 entitled "Radiation Detection System and Method of Indicating Presence of Radiation," by Frank, filed Dec. 29, 2009, which is assigned to the current assignee hereof and incorporated herein by reference in its entirety.

FIELD OF THE DISCLOSURE

The present disclosure is directed to radiation detection systems and methods of indicating presence of radiation.

RELATED ART

Radiation detection systems are used in a variety of applications. For example, Geiger counters and scintillation systems can be used in environments where radiation is present to detect radioactive species. Many radiation detection systems are designed to inform a user whether a particular type of radiation is present. For instance, a radiation detection system can be designed to detect gamma radiation, neutrons, or other radiation. Information about local sources of radiation can be used for safety and security purposes. Accordingly, the industry continues to need improvements in radiation detection systems.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Figure 1:
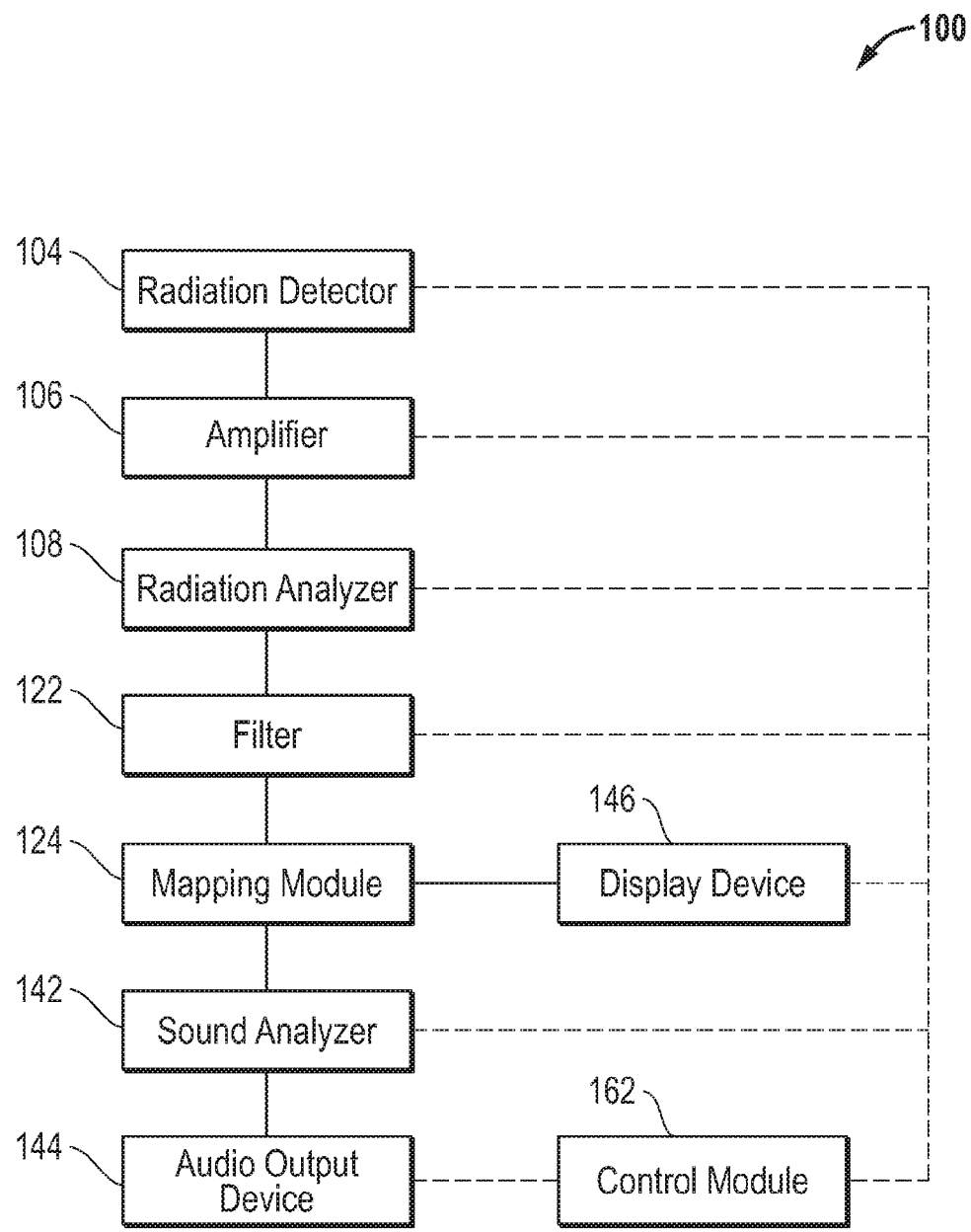
FIG. 1 includes a diagram of a radiation detection system in accordance with a particular embodiment.

FIG. 1 illustrates a particular embodiment of a radiation detection system 100. The system 100 can include a radiation detector 104 that is coupled to an amplifier 106, which is coupled to a radiation analyzer 108. The radiation analyzer 108 is coupled to a filter 122, which is coupled to a mapping module 124. The mapping module 124 can be coupled to output devices. For example, the mapping module 124 is coupled to a display device 146 and is also coupled to a sound analyzer 142, which is coupled to an audio output device 144. In another embodiment, more or fewer components may be used.

In another embodiment, the components as illustrated in FIG. 1 may be arranged differently. For example, the filter 122 may be placed after the mapping module 124. In another embodiment, an audio filter may be used be coupled to the sound analyzer 142 and the audio output device 144 or a video filter may be coupled to the mapping module 124 and the display device 146. The radiation detection system 100 can be under the control of a control module 162. The control module 162 can be coupled to any one or more of the components as illustrated in FIG. 1. In the embodiment as illustrated in FIG. 1, solid lines between blocks represent the flow of radiation, audio, or video information, and the dashed lines represent the flow of control information. Each of the components within the radiation detection system 100 is described in more detail below.

The radiation detector 104 detects one or more targeted radiation, which can include ionizing radiation, such as gamma rays, x-rays, alpha particles, beta particles, or any combination thereof. In an embodiment, the radiation detector 104 includes a scintillator, a Geiger sensor, another suitable radiation sensor, or any combination thereof. The radiation detector 104 can also include a counter, a photosensor, or another component that can generate a radiation signal that can be used by the radiation analyzer 108. If needed or desired an amplifier 106 can amplify the radiation signal from the radiation detector 104 before the radiation signal is received by the radiation analyzer 108.

The radiation analyzer 108 can generate radiation information that can be used to produce radiation spectra. Exemplary radiation information can include energy intensities at different energy levels. As used herein, the term energy level is intended to include an energy value, a range of energy values (also called an energy segment), a channel that corresponds to an energy value or range of energy values, or other similar division of energy values or ranges. In a particular embodiment, a lower limit on an energy value may be at least approximately 0 keV, and in another embodiment, the lower limit may be at least approximately 100 keV. In a further embodiment, an upper limit on an energy value may be no greater than approximately 10 MeV, and in another embodiment, the upper limit may be no greater than approximately 1800 keV. The energy levels can be expressed as channels, wherein a particular number of a channel corresponds to a particular energy value or range of values. The radiation analyzer 108 can be a multi-channel analyzer that includes at least approximately 256 channels, and in another embodiment, the multi-channel analyzer may have not more than approximately 8200 channels. In a particular embodiment, the radiation analyzer 108 has 2048 channels.

In other embodiment, energy levels can be in a form of energy segments that are assigned to corresponding bins. In a particular embodiment, the energy segments can be contiguous with their immediately adjacent energy segments. In a particular embodiment, each contiguous energy segment abuts another immediately adjacent energy segment. The user can determine the number of bins. For example, the number of bins can be at least approximately 8 bins, and in another embodiment, at least approximately 12 bins. In another embodiment, the number of bins may be no greater than approximately 64 bins, and in another embodiment, no greater than approximately 32 bins. Each energy segment can be at least approximately 10 keV wide, and in another embodiment, can be at least approximately 100 keV wide or at least approximately 200 keV wide. In another embodiment, each energy segment may be no wider than approximately 500 keV, and in another embodiment, no wider than approximately 300 keV.

Energy intensity can be measured as a radiation rate or as a count, wherein a higher radiation rate or count corresponds to higher intensity.

Although many implementation details are described with respect to the radiation analyzer 108, after reading this specification, skilled artisans will appreciate that the variables described may have values outside the ranges of those described above without departing from the scope of the concepts described herein.

The radiation analyzer 108 or another component within the radiation detection system 100 may include or have access to a list of predetermined radioactive species. If needed or desired, the radiation analyzer 106 or other component can associate a particular predetermined radioactive species to particular parts of the radiation information. For example, a particular predetermined species may be associated with a particular energy level. For example, $^{137}Cs$, which has a resonant energy of approximately 662 keV, can be associated with channel number 550, be associated with bin number 3 (of 12 bins), or any combination thereof. If the radioactive species detected does not correspond to a predetermined radioactive species within the list of predetermined radioactive species, the radiation analyzer 106 can associate an unknown identifier, for example "UNK1", "UNK2", or the like with the radiation information. Thus, the peaks can be identified, regardless whether any particular peak corresponds to a radioactive species that is or is not within the list of predetermined radioactive species.

The filter 122 is optional and its use can be configured for a particular application as needed or desired. The filter 122 can help to produce an output at an output device, such as the audio output device 144, display device 146, or another suitable output device, such that the output may be more readily understood by a user, such as a human. The filter 122 can use a smoothing function. In an embodiment, a background radiation spectrum and a sample radiation spectrum can be obtained. The background radiation spectrum is generated and corresponds to no radiation sample or other object present proximate to the radiation detection system 100, and the sample radiation spectrum is generated and corresponds to a sample present within the radiation detection system 100. The smoothing function can include subtracting the background radiation spectrum from the sample radiation spectrum to obtain a filtered radiation spectrum. In another embodiment, the smoothing function can include rounding a top of a sharp peak, a bottom of a steep valley, or a combination thereof. In still a further embodiment, the smoothing function may include averaging a particular reading with one or more adjacent readings.

In another embodiment, the filter 122 may include a normalizing function. The filter 122 may use the highest, lowest, or any intermediate intensity peak and a normalizing factor, and all readings can be divided by the normalizing factor. In a further embodiment, the filter 122 can include determining logarithms of energy intensities. The logarithmic scale may allow radioactive species detected at lower intensities to be more easily detected when another radioactive species is detected at a much higher intensity.

In yet another embodiment, the filter 122 can be set to filter out radiation information at a particular energy segment. In an embodiment, a radioactive species, which can include $^{137}Cs$, may be present but not be a radioactive species of interest. The filter 122 can remove radiation information at an energy level that includes 662 keV. In this manner, other radioactive species may be a focus of the analysis. In another embodiment, energy values less than approximately 500 keV may be filtered, as this portion of the spectrum is typically noisier than other parts of the spectrum. In a further embodiment, energy values less than approximately 400 keV may be filtered, and in still another embodiment, energy values less than approximately 300 keV may be filtered.

Other filters may be used in conjunction with or in place of the filter 122. For example, an audio filter may be used between the mapping module 124 and the audio output device 144, or a video filter may be used between the mapping module 124 and the display device 146.

After reading this specification, skilled artisans will appreciate that filtering may or may not be used and the location where filtering is performed is flexible. The filtering can be tailored to a particular application and can allow a user to more readily understand an output at an output device, such as the display device 146 or the audio output device 144.

The mapping module 124 can map the radiation information, including energy intensities at particular energy levels to audible intensities at particular audible frequencies. In an embodiment, the audible frequency is at least approximately 20 Hz, and in another embodiment is at least approximately 100 Hz. In a further embodiment, the audible frequency is no greater than approximately 20,000 Hz, and in another embodiment, the audible frequency is no greater than approximately 10,000 Hz. In a particular embodiment, the audible frequencies are in a range of approximately 300 Hz to approximately 5000 Hz. Energy levels can be proportional to audible frequencies.

In a particular embodiment when the radiation information includes energy levels, a linear or other arithmetic function can be used to convert energy levels to audible frequencies. In another particular embodiment where the radiation analyzer 108 generates the energy information in the form of channel numbers, a table may provide a particular audible frequency that corresponds to a particular channel number. In still another particular embodiment where the radiation analyzer 108 generates the energy information in the form of bins, a table may provide a particular audible frequency that corresponds to a particular bin. Thus, an arithmetic function, a table, or another suitable methodology can be used to map the energy levels to audible frequencies.

In still another embodiment, a user can assign any audible frequency to any energy level. Thus, a user may decide that a lower energy level is to be assigned to a higher audible frequency and a higher energy level is to be assigned to a lower audible frequency. If desired, the audible frequencies can correspond to musical notes. For example, the bins could be assigned to musical notes, as musical notes are more widely recognized and may be easier to identify and remember.

A sound analyzer 142 can use radiation information and the audible frequency information to produce an audio signal for the audio output device 144. The radiation information can include the energy intensity information, and, after the energy levels is mapped to the audible frequencies, the sound analyzer 142 can provide audible intensity information for the audio signal. The audible intensity information within the audio signal can be in the form of a greater amplitude of sound or a faster rate of repeating a sound (also called, sound repetition rate) at a particular audible frequency at the audio output device 144. In one embodiment, the sound repetition rate can be at least approximately 1 sound/10 minutes, and in another embodiment, the sound repetition rate can be at least approximately 1 sound/minute. In a further embodiment, the sound repetition rate may be no greater than approximately 10 sounds/second, and in another embodiment, the sound repetition rate may be no greater than approximately 2 sounds/second. The audio signal can be sent from the sound analyzer 142 to an audio output device 144, such as an audio speaker. A user, such as a human, will be able to listen to the radiation information in the form of sounds without having to look at a video output device, such as a display or a pass/fail light.

Returning to the mapping module 124, the information from the mapping module 124 can be sent to a display device 146 in addition to or instead of the sound analyzer 142. The display device 146 can display the radiation information in the form of an energy spectrum. In another embodiment, the display device 146 displays an audio spectrum corresponding to the energy spectrum that includes the radiation information. Either spectrum or both spectra may display filtered or unfiltered data.

The control module 162 can be coupled to any or all of the components within the radiation detection system 100. In an embodiment, the control module 162 can control the starting and stopping of data collection by the radiation detector 104. In another embodiment, the control module 162 can control the gain of the amplifier 106. In still another embodiment, the control module 162 can receive information from the radiation analyzer 108 regarding characteristics of the radiation data, for example, if energy levels are in terms of energy values, such as keV, MeV or the like, in terms of channel numbers, and so forth. Such characteristics can be forwarded from the control module 162 to the mapping module 124. In a further embodiment, the control module 162 can be used to activate or deactivate the filter 122, to provide filtering characteristics to the filter 122, or both. For example, the filtering characteristics can include using a smoothing function, using a logarithmic scale for intensity, skipping particular energy ranges, examining only one or more particular energy ranges, another suitable filtering characteristic, or any combination thereof.

In an embodiment, the control module 162 can control the mapping module 124 to allow mapping of radiation information to corresponding audio information. For example, the control module 162 can instruct the mapping module 124 regarding limits and divisions for the energy information and corresponding audible frequencies. For example, the energy information can be in the form of a substantially continuous distribution of energy levels and a corresponding substantially continuous distribution of audible frequencies. In a particular non-limiting embodiment, the energy values can range from approximately 0 to approximately 3 MeV or even as high as approximately 10 MeV and audible frequencies can range from approximately 100 Hz to approximately 5000 Hz, wherein both ranges are substantially continuous. In another particular embodiment, the energy information can include energy levels at approximately 2048 different channels that correspond to 2048 different audible frequencies from approximately 300 Hz to approximately 5000 Hz. In still another embodiment, the energy information can be separated into a smaller number of groupings. For example, the energy spectrum can be separated into approximately 12 to approximately 16 energy segments, wherein each of the energy segments corresponds to a different frequency (as compared to the other audible frequencies for the other energy segments). After reading this specification, skilled artisans will appreciate that other techniques can be used to map energy information to audio information.

In still another embodiment, the control module 162 can control the sound analyzer 142 and audio output device 144. For example, the control module 162 can include a selector that allows a user to determine whether the audio signal to be generated by the sound analyzer 142 is to use an amplitude mode, a repetition mode, or a combination thereof. In a particular embodiment, the user can determine that he or she desires that energy intensity information within the radiation information to correspond to amplitudes of audible frequencies at the audio output device 144. As the energy intensity for a particular energy level increases, the amplitude of a tone at the corresponding audible frequency for that particular energy level will likewise increase. In another particular embodiment, the user can determine that he or she wants that audible intensity information within the radiation information to correspond to particular sound repetition rates at the audio output device 144. As the intensity for a particular energy level increases, the sound repetition rate of a tone at particular audible frequency for that particular corresponding energy level will likewise increase. The repetition mode can be similar in operation to the rate of clicks from a Geiger counter; however, different audible frequencies can be used for different energy levels. In still another embodiment, both the amplitude and sound repetition rate of a tone at a particular frequency can increase with increasing energy intensity.

The control module 162 can also be used to control the audio output device 144. In an embodiment, the control module 162 can provide an overall volume control of the audio output device 144. For example, the control module 162 can include a mute function, so the audible output device does not output any significant sound. In another embodiment, the user can select an overall volume control that works well with his or her hearing, as the ability to discern particular audible frequencies may vary between individuals. In another embodiment, a frequency equalizer or other similar component can be provided by the control module 162. For example, a user may increase the volume of a lower audible frequency to make it more perceptible, as a human's response to a higher audible frequency may be greater than the lower audible frequency when both audible frequencies are at the same volume level.

The control module 162 can control the display device 146 to display different types of information. In an embodiment, the radiation information can be displayed in a form of an energy spectrum. In another embodiment, the audio information can be displayed in a form of an audio spectrum. In still another embodiment, corresponding energy and audio spectra can be displayed simultaneously during at least one time period. The filtering techniques previously described can also be applied to the video information that is displayed on the display device 146. For example, background radiation or audio information corresponding to the background radiation can be subtracted from the energy or audio spectrum. In another example, a particular energy range may be omitted from the energy or audio spectrum (for example, displayed as zero intensity for that particular energy range). In another embodiment, one or more peaks within the energy or audio spectrum can be labeled with a corresponding radiation species (for example, "Cs" for $^{137}$Cs). If a peak does not correspond with a corresponding radiation species within a list of predetermined radiation species, such peak can be labeled as an unknown radiation species (for example, "UKN").

The control module 162 may include hardware, firmware, or any combination thereof that are configured to perform operations as described in this specification. Examples of such hardware and firmware include circuits within one or more integrated circuits, one-time programmable devices, field programmable gate arrays, and the like. After reading this specification, skilled artisans will appreciate that other components can be used. In another embodiment, the control module 162 can include a central processing unit, a graphics processing unit, another processing unit, or any combination thereof. In still another embodiment, the control module 162 can be coupled to a storage device, which can be a tangible processor-readable medium. The storage device can include a hard disk, a read-only memory, random-access memory, a memory drive within a storage network, or the like. The storage device can include code that includes instructions to carry out the operations. The control module 162 can retrieve code from the storage device and execute instructions within the code. The control module, the storage device, or both may be coupled to other equipment within the radiation detection system 100 or may be coupled to a network After reading this specification, skilled artisans appreciate that many of the functions as described within respect to a particular component within the radiation detection system 100 may be performed by another component within the radiation detection system 100. In particular, control functions provided by the control module 162 can be performed by the corresponding component. Further, although particular functions are described with respect to particular components, one or more particular function can be performed by a different component within the radiation detection system 100. Thus, although many specific details have been described with respect to components within the radiation detection system 100, such specific details are to be construed as exemplary and do not limit the scope of the present invention.

Figure 2:
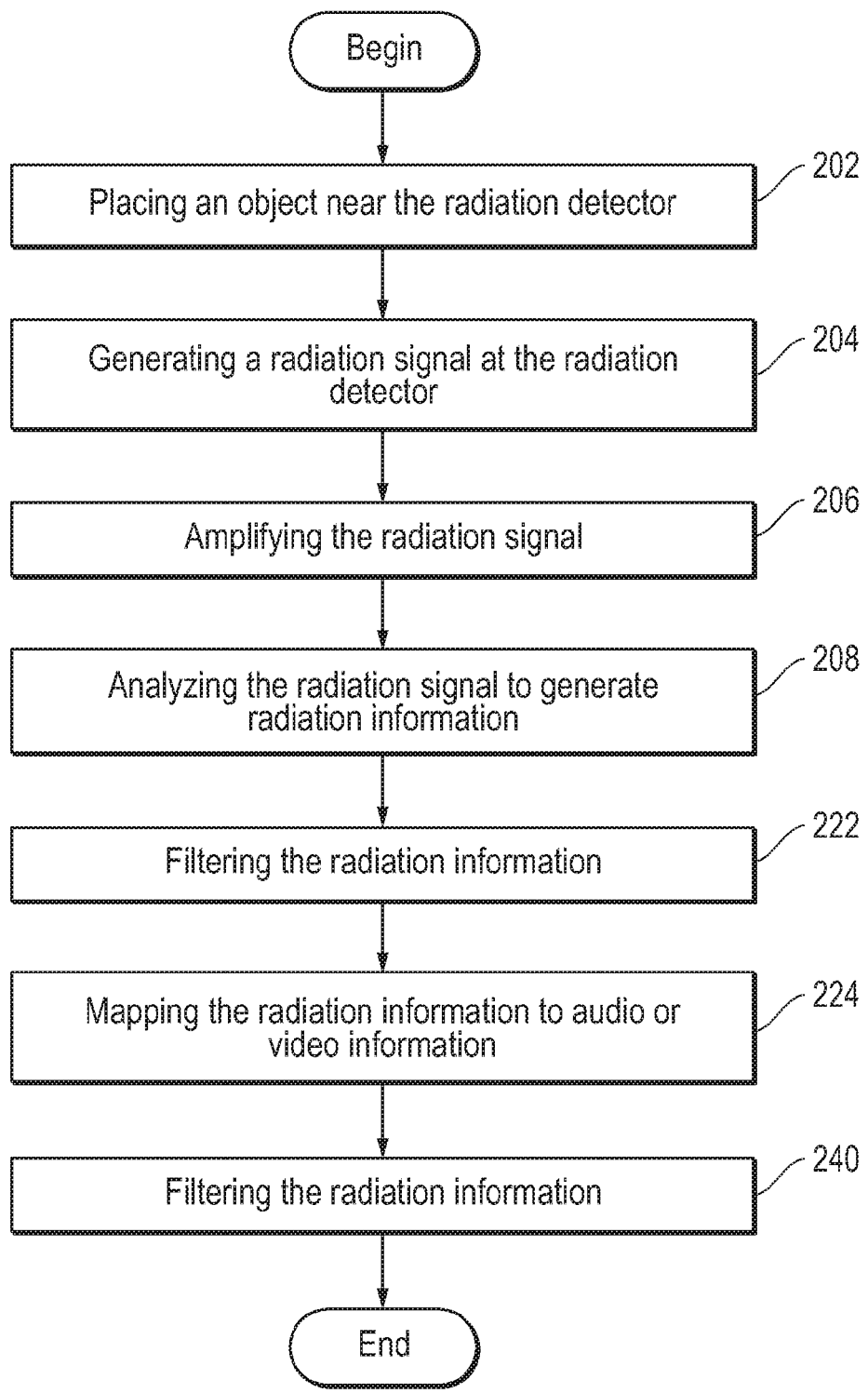
FIG. 2 includes a flowchart of a method of using a radiation detection system in accordance with a particular embodiment.

A method of using the radiation detection system 100 is illustrated in a flowchart in FIG. 2. The method can include placing an object near the radiation detector, at block 202 in FIG. 2. The object may or may not include a radioactive species. The object can include or be disposed within, for example, cargo transported by a vehicle or person, a rock or a geological feature, an organ, a tissue, or a bone of a human, another suitable object, or any combination thereof.

The method can also include generating a radiation signal at the radiation detector, at block 204 in FIG. 2. The radiation signal generated by the radiation detector 104 can be in a form of an electronic pulse. The term radiation signal is used to differentiate such a signal generated by the radiation detector 104 from an audio signal that may be used by an audio output device 144, and a video signal that may be used by the display device 146 to produce a visual output at the display device. In a particular embodiment, where the radiation detector 104 includes a photosensor, the radiation detector 104 can send an electrical pulse corresponding to the detected radiation to the analyzer 108. If needed or desired, the method can also include amplifying the radiation signal, at block 206. In the embodiment illustrated in FIG. 1, the amplifier 106 can be amplify the radiation signal, such as an electrical pulse, before the radiation signal is received at the radiation analyzer 108.

The method can further include analyzing the radiation signal, at block 208 in FIG. 2. In the embodiment illustrated in FIG. 1, the radiation analyzer 108 can analyze the radiation signal to generate radiation information that can include energy information and energy intensity information. The form of the information may vary depending on the equipment configuration. For example, the energy information can include an energy level expressed in a form of an energy value (for example, approximately 662 keV), a channel number (for example, channel number 550), an energy segment (for example, approximately 500 to approximately 700 keV), or the like. The energy information can include an energy intensity expressed in a form of a radiation rate or a number of counts. In an embodiment, a higher radiation rate or number of counts will be detected when the resonant energy of a radioactive species is detected.

The method can include filtering the radiation information, at block 222 in FIG. 2. The filtering can be performed using any one or more of the filtering techniques previously described. Further, the filtering can be performed between any of the components downstream from the radiation analyzer 108. As illustrated in FIG. 1, the filter 122 is disposed between the radiation analyzer 108 and mapping module 124. In another embodiment, a filter may be used after mapping module 124. Thus, filtering can be performed when information is in a form of radiation information, audio information, or video information.

The method can further include mapping the radiation information to audio or video information, at block 224 of FIG. 2. Referring to the embodiment as illustrated in FIG. 1, the mapping module 124 can map the radiation information received into audible frequencies and audible intensities, such as an amplitude of a tone at a particular frequency, a sound repetition rate for a tone at such frequency, or both. The mapping module 124 can produce an audio signal for the sound analyzer 142 and audio output device 144, a video signal for the display device 146, or both. Different embodiments can be implemented, many of which have been previously described.

The method can still further include outputting the audio or video information, at block 240 of FIG. 2. In the embodiment as illustrated in FIG. 1, the sound analyzer 142 receives the audio information and generates an audio signal for the audio output device 144. The audio output device 144 can generate sounds that can be perceived by a user, such as a human. The sounds can be in a form of tones at audible frequencies. In another embodiment, the radiation or audio information can be converted to video signal that is used by the display device 146. In a particular embodiment, the display device can display an audio spectrum that depicts audible frequencies and corresponding audible intensities.

EXAMPLES

The concepts described herein will be further described in the following examples, which do not limit the scope of the invention described in the claims.

Example 1

Figure 3:
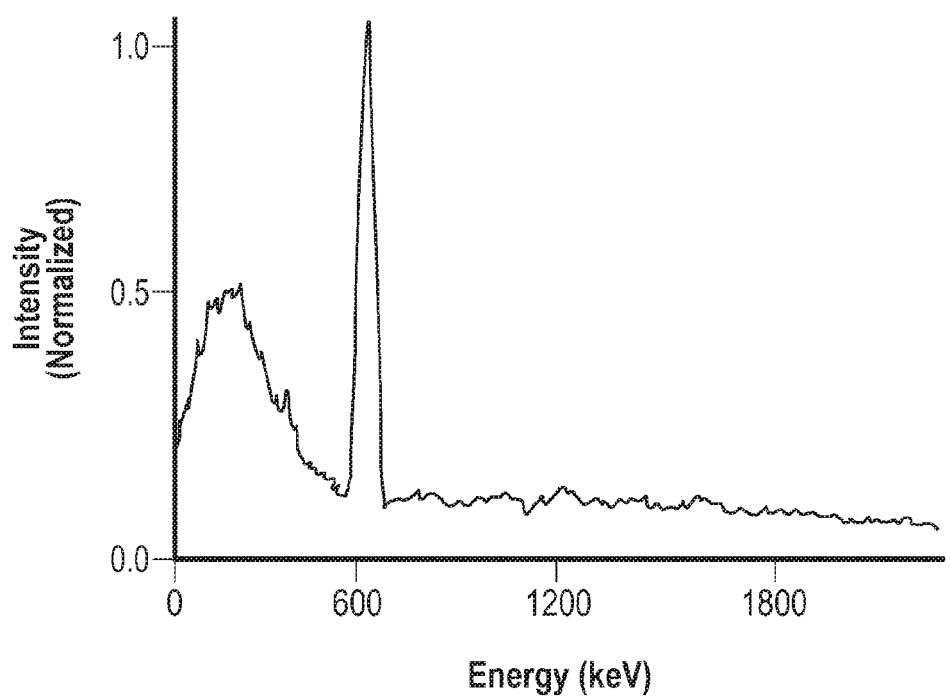
FIGS. 3 and 4 include illustrations of energy spectra obtained from an object when using a radiation detection system.
Figure 4:
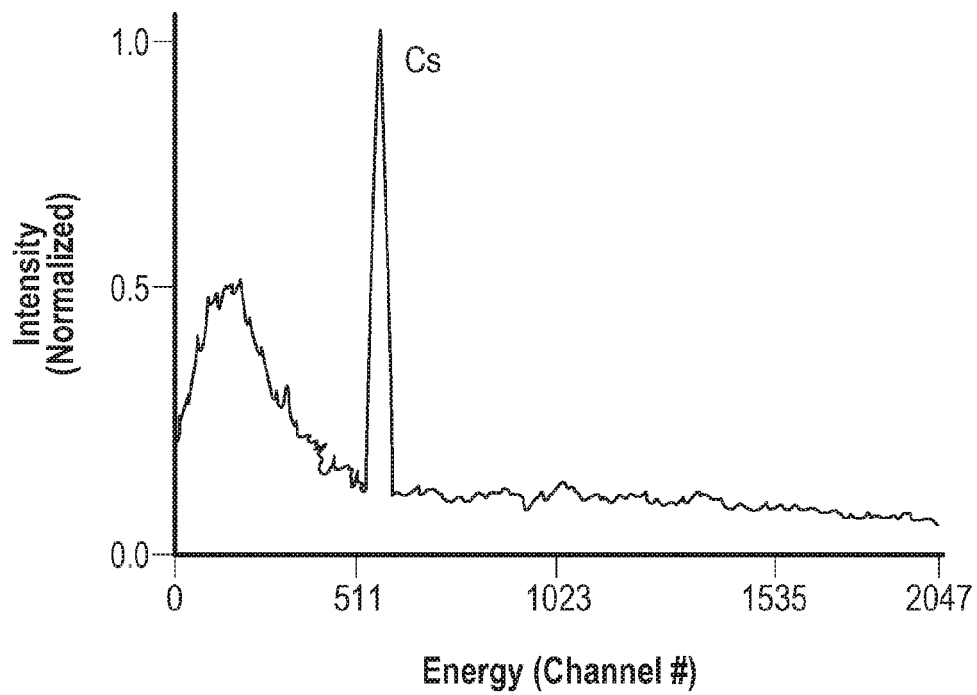

Example 1 demonstrates that an audible frequency spectrum can be output in a scanning mode at the audio output device 144. The radiation information can be a form as illustrated in FIG. 3 or 4. Referring to FIG. 3, the energy information includes energy levels expressed as energy values in units of keV, and the intensity is normalized. Referring to FIG. 4, the energy information including energy levels expressed as channel numbers using a multi-channel analyzer ("MCA"). In a non-limiting embodiment, the multi-channel analyzer is a CANBERRA EAGLEPLUST™-brand MCA available from Can berra, Inc. of Meriden, Conn., USA. In this Example 1, the MCA has 2048 channels including channel number 0 through channel number 2047. In FIG. 4, a peak is near channel number 550 and is labeled as "Cs." The peak corresponds to $^{137}$Cs. Therefore, as illustrated in FIGS. 3 and 4, peaks may or may not labeled.

Figure 5:
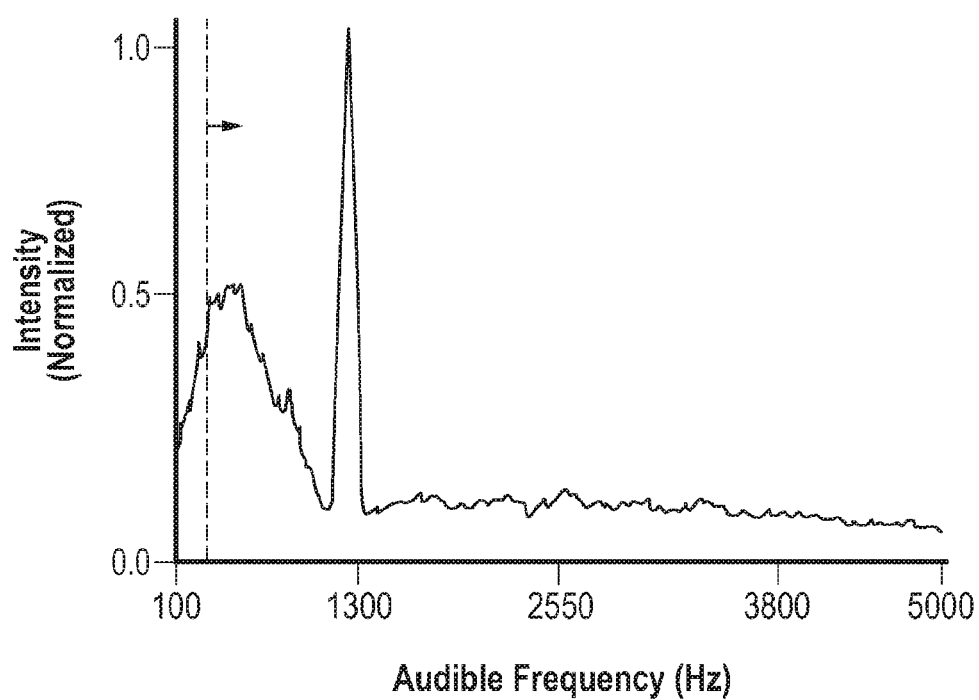
FIGS. 5 to 8 include illustrations of an audio spectrum at different points of time during a scan, wherein the audio spectrum corresponds to the energy spectrum of FIG. 3 or 4.
Figure 6:
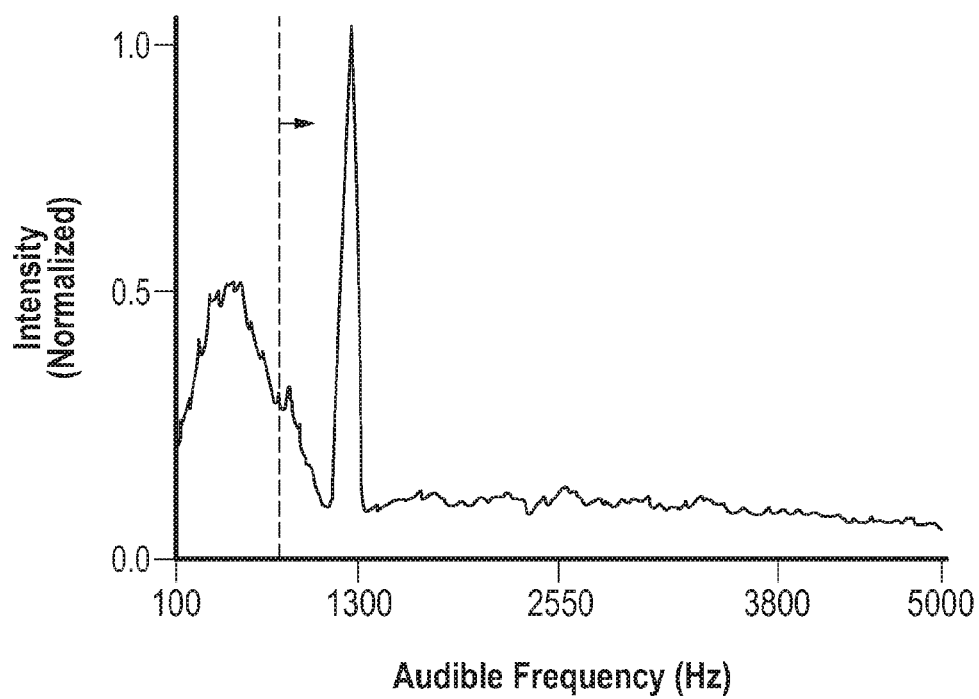
Figure 7:
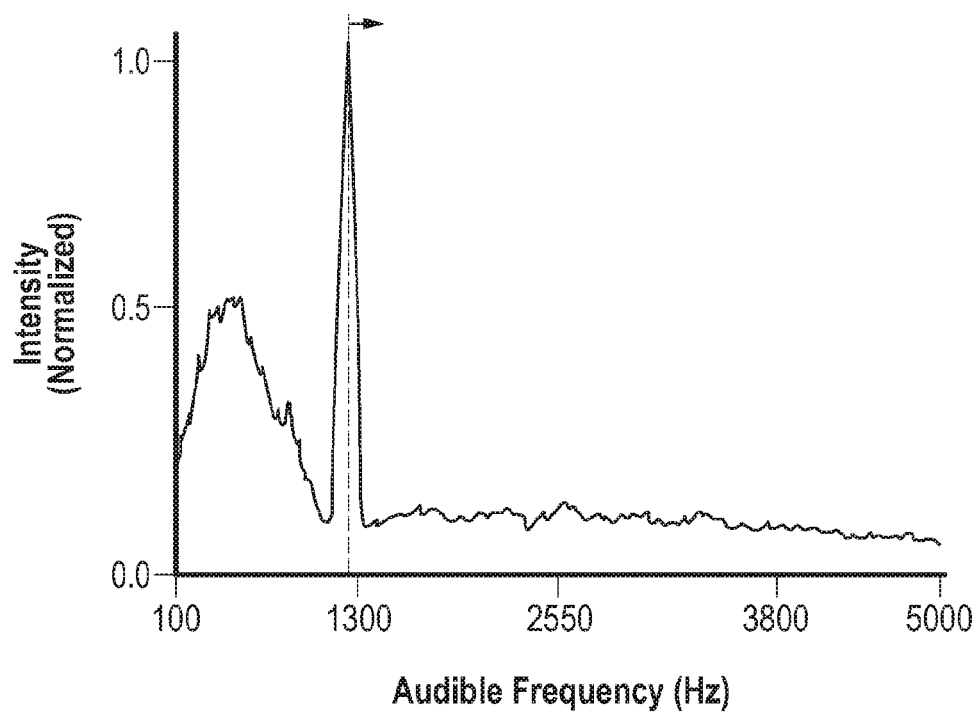
Figure 8:
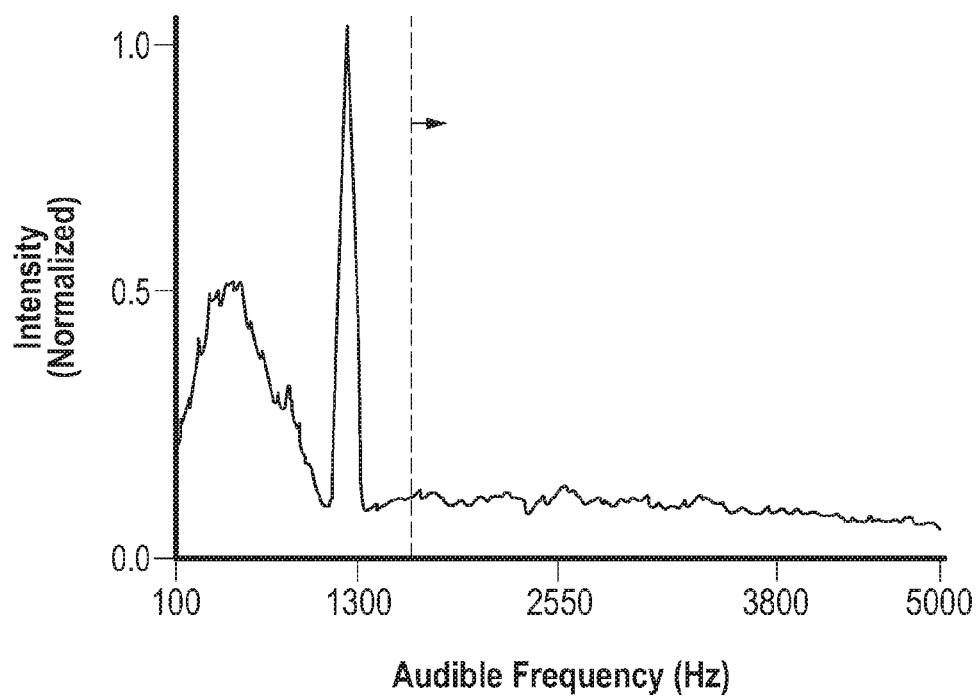

FIGS. 5 to 8 correspond to an audio spectrum at different times during a scan. The audio spectrum as illustrated in FIGS. 5 to 8 can be derived from the energy spectrum in FIG. 3 or 4. The dashed line in FIGS. 5 to 8 illustrates particular points during a scan of the audible frequencies, and the arrow illustrates the movement during the scan. The display device 146 may display the information illustrated in FIGS. 5 to 8 except that the arrow adjacent to the dashed line may not be displayed. The information as illustrated in FIGS. 5 to 8 can be put in the form of an audio signal that can be used by the audio output device 144 to generate an audio spectrum that can be heard by a human. As illustrated in FIGS. 5, 6, and 8, the audio output device 146 generates audible sounds at different frequencies for portions of the spectrum that do not correspond to a radioactive species detected by the radiation detector 104. In particular, sounds are produced along substantially all of the audible frequency spectrum. For example, sounds at approximately 300 Hz, approximately 900 Hz, and approximately 1600 Hz (corresponding to FIGS. 5, 6, and 8) are still produced at the audio output device 144, even though no radioactive species are detected at energy levels corresponding to those audible frequencies. A radioactive species, and in particular $^{137}$Cs, is detected and corresponds to a sound at approximately 1300 Hz. The audible intensity for Example 1 may be normalized and output as an amplitude (for example, in units of decibels) at the particular frequencies.

Thus, with Example 1, substantially complete spectrum or radiation information can be obtained. Different frequencies that do not correspond to any radioactive species detected are still output at the audible output device 144. In Example 1, a user may hear a more complete set of audible information including tones at different audible frequencies that do not correspond to radioactive species within a list of predetermined radioactive species.

Example 2

Figure 9:
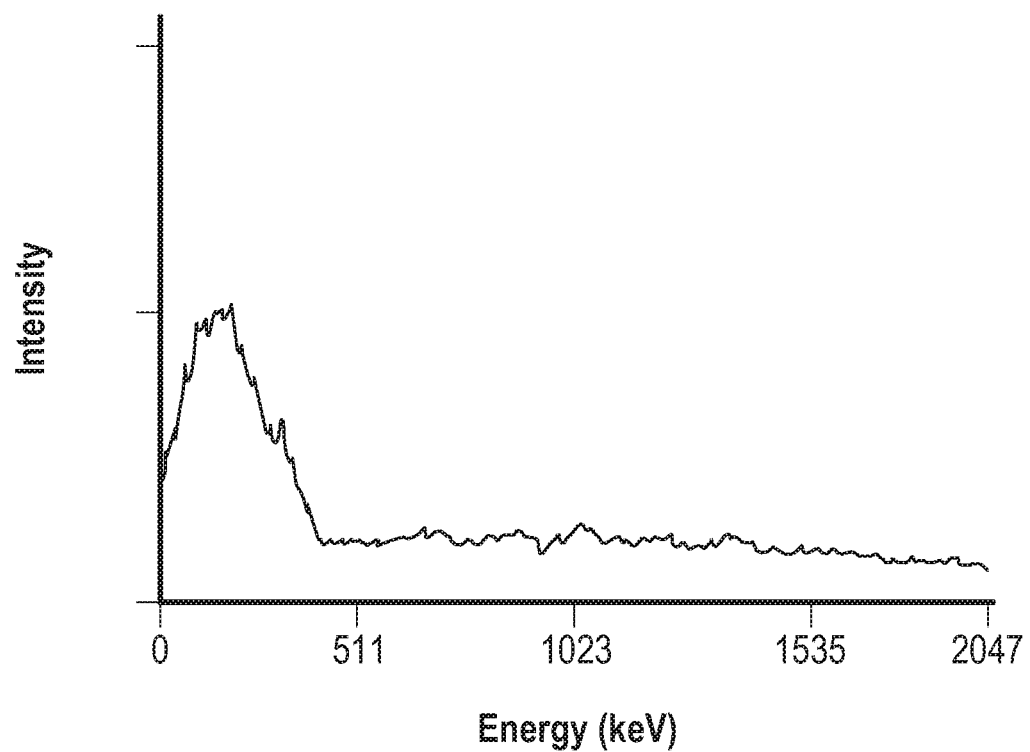
FIG. 9 includes an illustration of an energy spectrum corresponding to background radiation.
Figure 10:
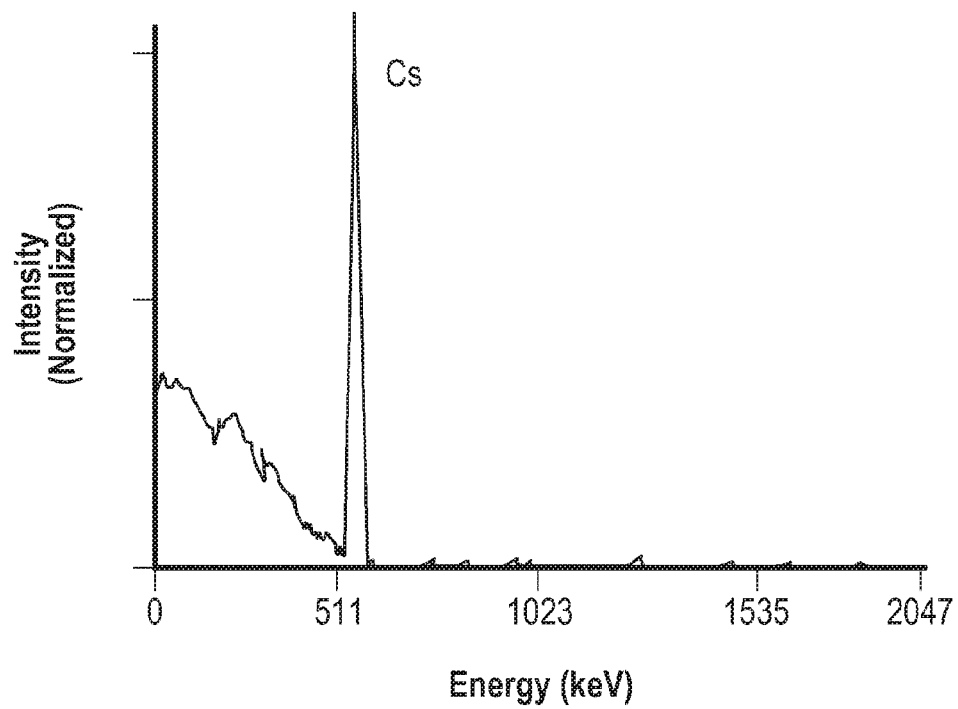
FIG. 10 includes an illustration of a filtered energy spectrum corresponding to the energy spectrum FIG. 4 after subtracting the energy spectrum of FIG. 9.
Figure 11:
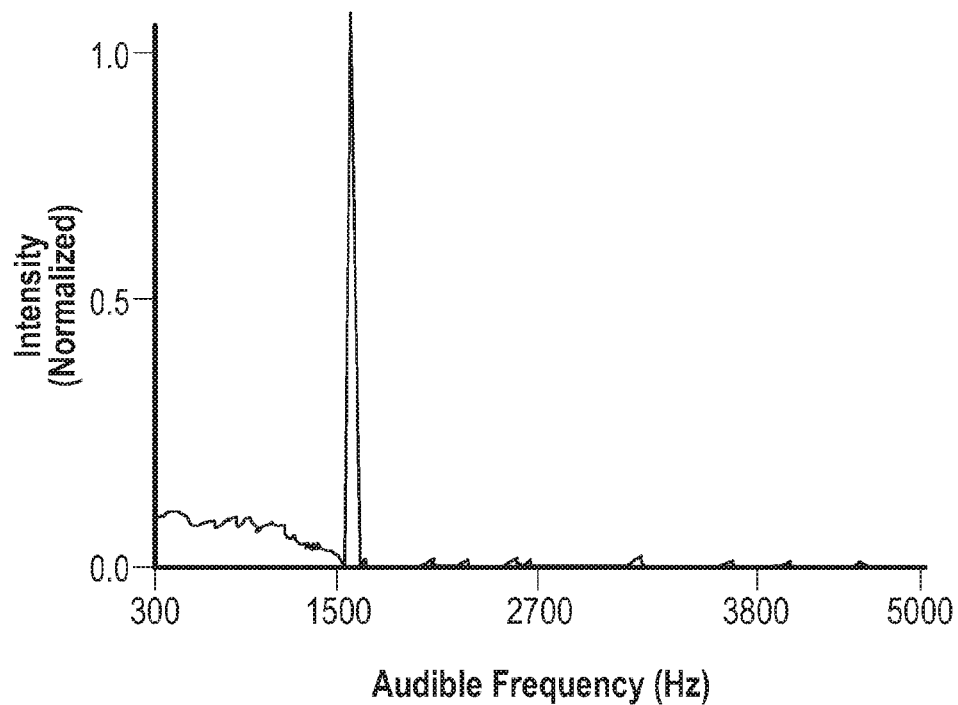
FIG. 11 includes an illustration of an audio spectrum corresponding to the energy spectrum of FIG. 10.

Example 2 demonstrates that a filtering technique can be used. In this Example 2, a background radiation spectrum can be obtained using the radiation detection system 100. FIG. 9 illustrates a background radiation that can be obtained. A smoothing function can include subtracting the background spectrum in FIG. 9 from the energy spectrum illustrated in FIG. 4 to produce the spectrum in FIG. 10. Negative intensity values may be discarded. Although a portion of the spectrum includes Compton energy (corresponding to Compton radiation related to the detected isotope) to the left of the $^{137}$Cs peak, the $^{137}$Cs peak is clearly visible as the only detected radioactive species in this particular spectrum. FIG. 11 includes a corresponding audible frequency spectrum with the $^{137}$Cs. For the spectrum in FIG. 11, the audible frequency has 300 Hz as the lowest audible frequency output by the audio output device. Other than a sound at approximately 1500 Hz, the remainder of the sounds output by the audio output device 144 is portions of the spectrum where no sounds will be made and others where the amplitudes of the sounds are very small relative to the sound corresponding to $^{137}$Cs.

Example 3

Figure 12:
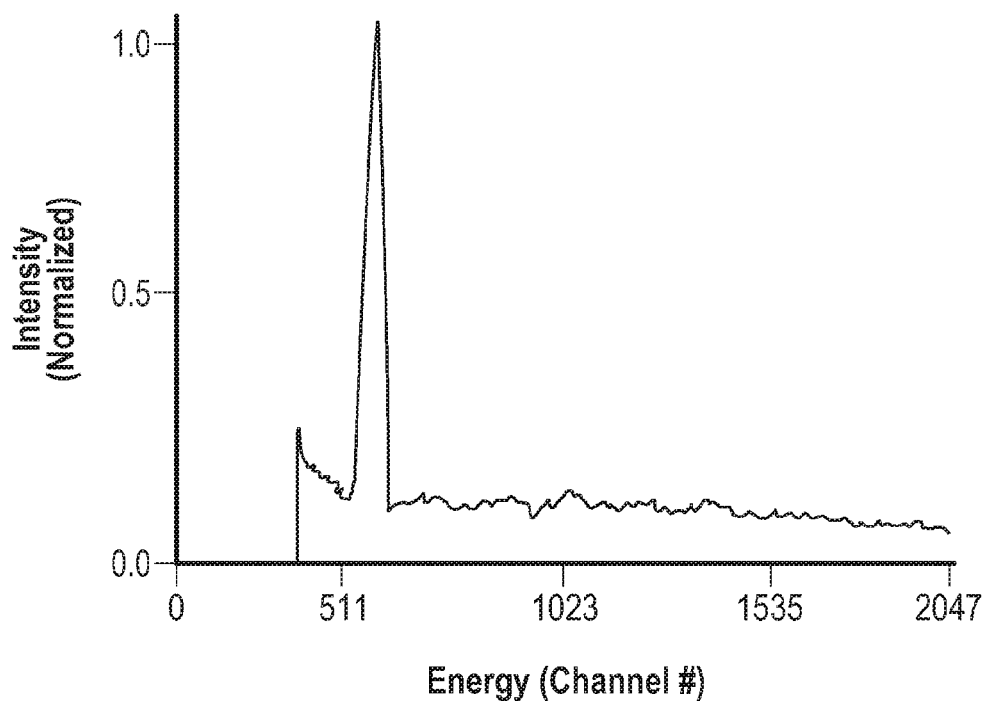
FIGS. 12 and 13 include illustrations of energy and audio spectra where low energy values are filtered out.
Figure 13:
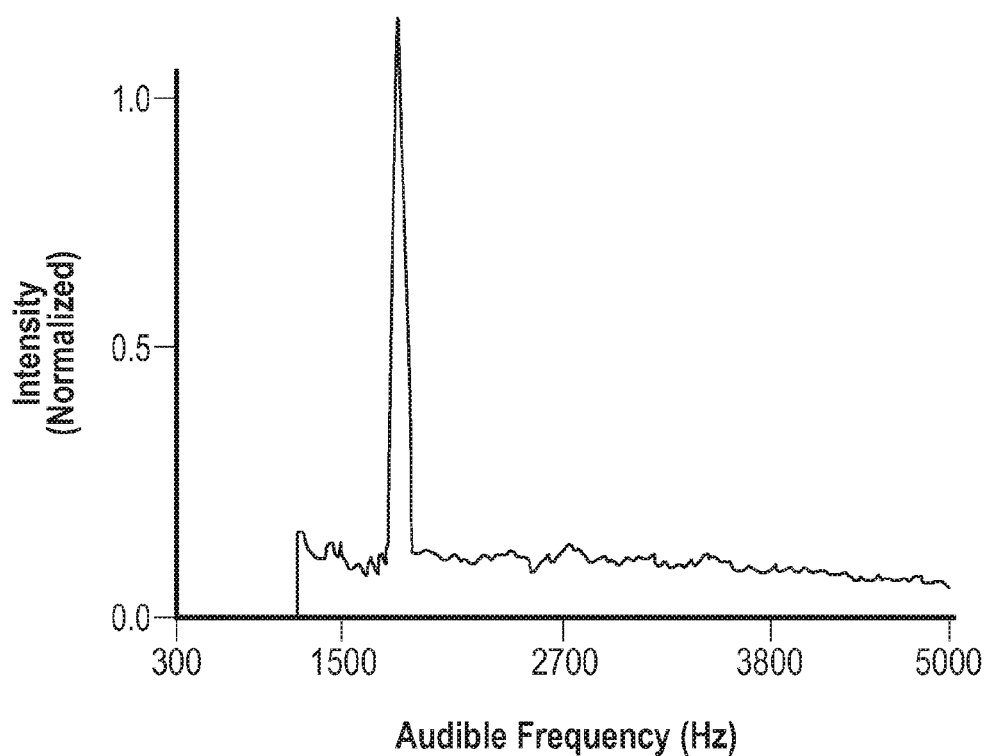

Example 3 demonstrates another filtering technique. A significant amount of background radiation corresponds to energy values up to approximately 500 keV. When this part of the energy spectrum is excluded, the spectrum is easier to understand. In this Example 3, the radiation analyzer 108 can be an MCA that does not analyze data from channel number 0 to channel number 499, and therefore, data is analyzed at channel number 500 and higher. Alternatively, the filter 122 may be configured to filter out date between channel number 0 to channel number 499. FIG. 12 illustrates a radiation spectrum after such filtering. The energy spectrum is similar to the energy spectrum in FIG. 4, except that FIG. 12 omits the lower channel numbers. FIG. 13 illustrates a corresponding audio spectrum. In this Example 3, the audio output device 144 outputs sounds starting at approximately 1300 Hz.

Example 4

Figure 14:
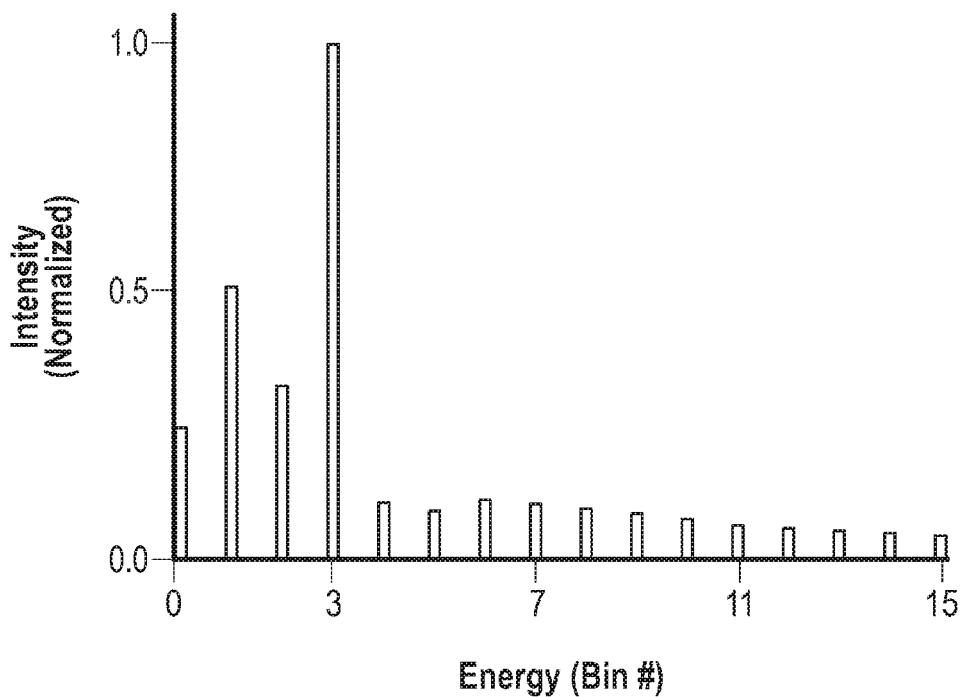
FIGS. 14 and 15 include illustrations of energy and audio spectra demonstrating the use of bins for energy levels.
Figure 15:
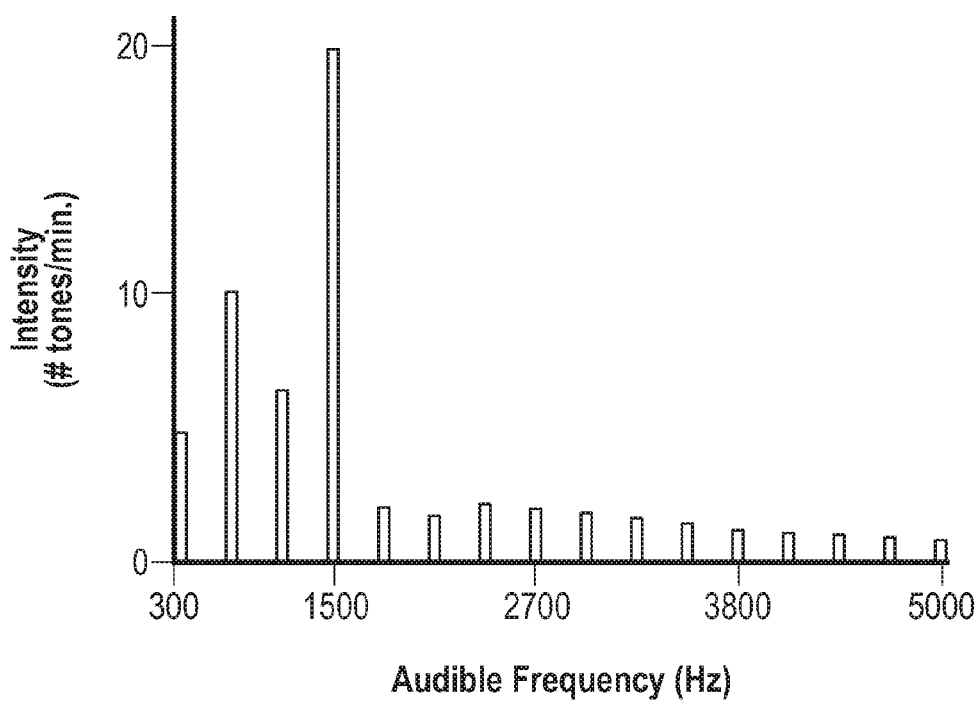

Example 4 demonstrates that discrete energy levels can be used. In this Example 4, each particular energy segment can be assigned to a specific bin number. For example, bin number 0 can represent an energy segment from 0 to 199 keV, bin number 1 can represent an energy segment from 200 keV to 399 keV, bin number 2 can represent an energy segment from 400 to 599 keV, and so forth. FIG. 14 illustrates an energy spectrum similar to the radiation spectra in FIGS. 3 and 4, except that FIG. 14 assigns energy segments to bins. Bin number 3 includes an energy value for the $^{137}$Cs peak. FIG. 15 illustrates a corresponding audio spectrum. In this Example 4, the audio output device 144 can output a series of discrete sounds corresponding to the bins, as illustrated in FIG. 15. In the audio spectrum in FIG. 15, the audible intensity is output in a repetition mode. As the intensity increases, the audible output is heard as sounds that are repeated at different sound repetition rates. For example the $^{137}$Cs peak is produced at the audio output device 144 as approximately 20 sounds/minute for tones at approximately 1500 Hz. Within the background radiation, the highest intensity seen with bin number 1 is produced at the audio output device 144 as approximately 10 sounds/minute with each sound being a tone at approximately 700 Hz.

Example 5

Figure 16:
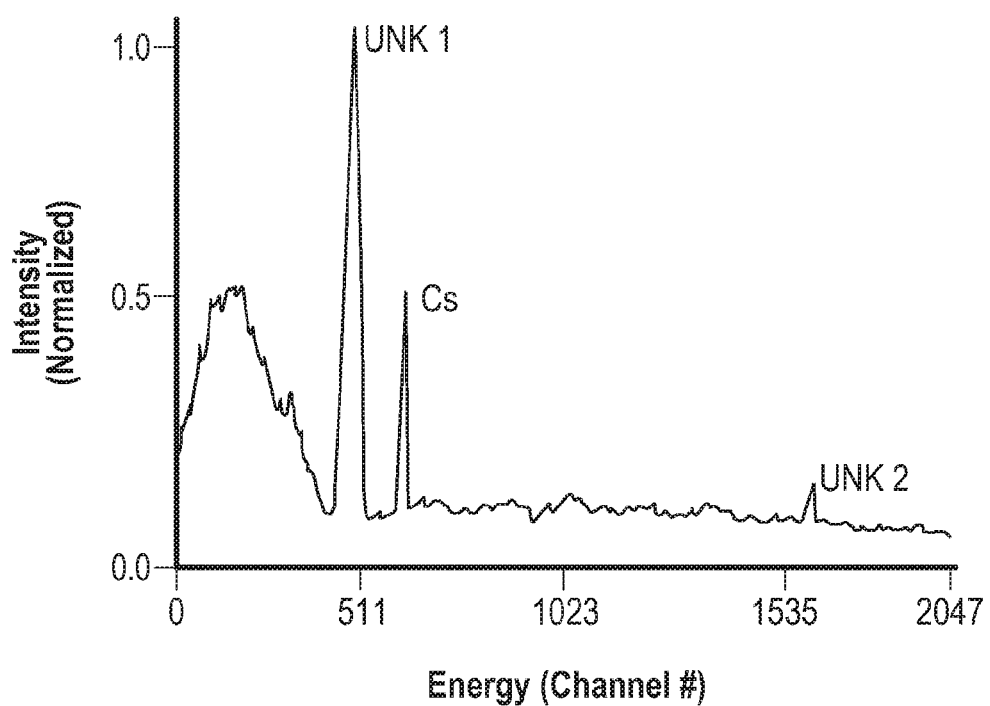
FIGS. 16 and 17 include illustrations of energy and audio spectra demonstrating peaks of an unknown radioactive species and different tones produced for the different peaks.
Figure 17:
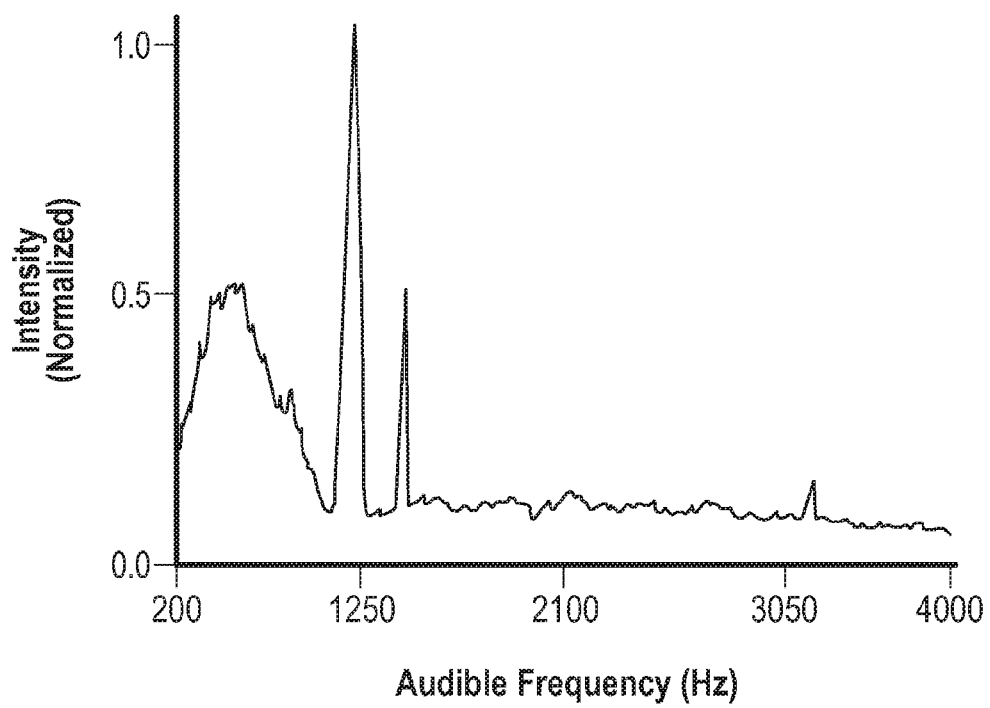

Example 5 demonstrates that different peaks that do not correspond to a radioactive species within a list of predetermined radioactive species can produce sounds at different audible frequencies. In this Example 5 and in reference to FIG. 16, the energy spectrum is similar to the energy spectrum in FIGS. 3 and 4, except that two peaks are illustrated before and after the $^{137}$Cs peak. Because the peaks do not correspond with a radioactive species within the list, the peaks are labeled "UNK1" and "UNK2" in FIG. 16. The peaks can correspond to energy values for $^{22}$Na, which are at 511 keV and 1274 keV. The corresponding audio spectrum is illustrated in FIG. 17. The audio output device 144 produces sounds as tones at different audible frequencies for the two peaks corresponding to UNK1 and UNK2 in FIG. 16. An audible output from the audio spectrum in FIG. 17 may be in the form of an audible scan or as repeated sounds, where the sounds are repeated at a rate that is a function of the intensity.

Example 6

Figure 18:
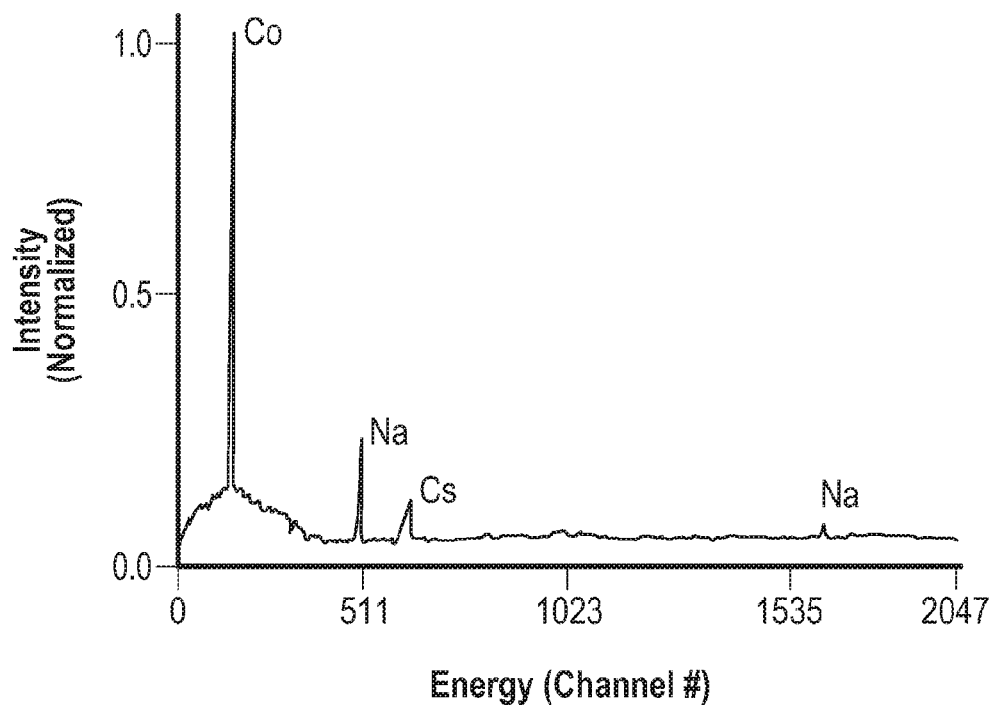
FIGS. 18 and 19 include illustrations of energy and audio spectra demonstrating the use of filtering techniques that improve detection of smaller peaks while maintaining higher audible intensities for higher energy intensities.

Example 6 demonstrates that filtering techniques can be used and allow peaks at lower intensities to be increased relative to more intense peaks. In this Example, objects are placed near the radiation detector 104. The objects include $^{57}$Co that emits approximately 30 μCi of radiation, $^{137}$Cs at approximately 8 to 9 μCi, and $^{22}$Na at approximately 8 to 9 μCi. FIG. 18 includes radiation information generated by the radiation analyzer 108. The peak for $^{57}$Co is significantly higher than the peaks for $^{137}$Cs and $^{22}$Na. In particular, the peak for $^{22}$Na at approximately channel number 1600 has an intensity that is slightly higher than the background signal. On a relative basis, the $^{57}$Co peak is approximately 5 times higher than the $^{22}$Na peak at approximately channel number 510, approximately 22 higher than the $^{137}$Cs peak, and approximately 110 times higher than the $^{22}$Na peak at approximately channel number 1600.

Figure 19:
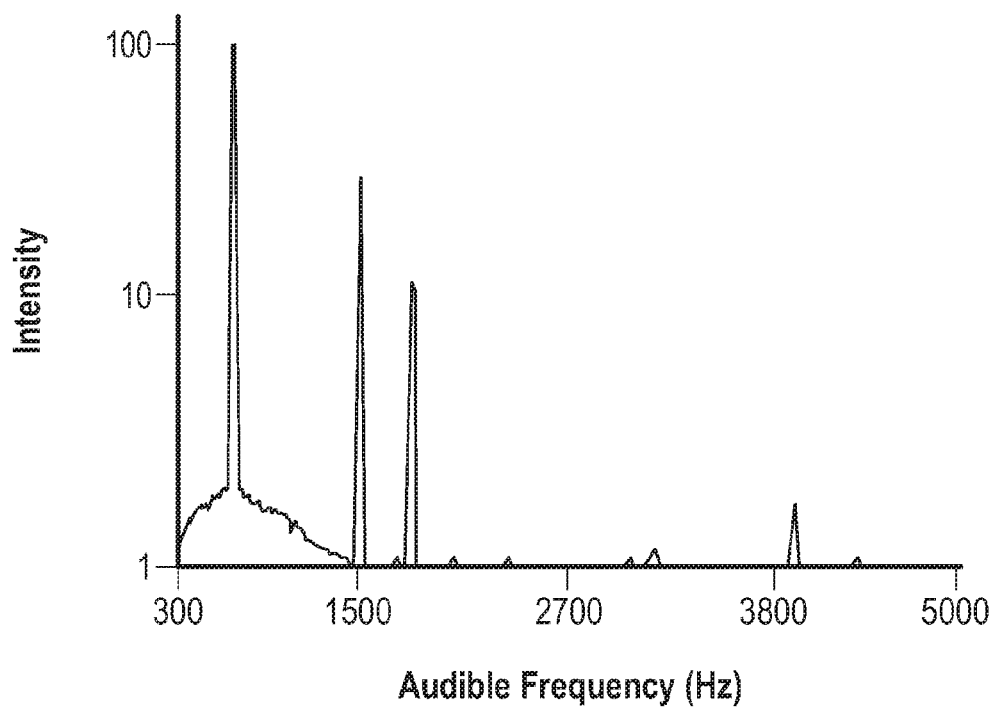

Two filtering techniques may be used to improve the detection of the $^{22}$Na peak at approximately channel number 1600. The background radiation spectrum as illustrated in FIG. 9 can be subtracted from the spectrum as illustrated in FIG. 18. Further, a logarithmic scale can be used to make the $^{22}$Na peak at approximately channel number 1600 more readily detectable. FIG. 19 includes an audio spectrum that can be produced with such filtering techniques. The $^{57}$Co peak corresponds to a sound at approximately 700 Hz, and the $^{22}$Na peak at approximately channel number 1600 corresponds to a sound at approximately 3900 Hz. At the audio output device 144, the amplitude, sound repetition rate, or both of the sound at approximately 700 Hz (corresponding to the $^{57}$Co peak) is higher than the amplitude, sound repetition rate, or both of the other sounds corresponding to the other peaks. Thus, smaller peaks can be more readily detected while still maintaining intensity information.

Particular embodiments as described herein can be useful for users of radiation detection systems. Some applications may require a user of the radiation detection system to view a particular object while listening to the audible sounds output by an audio output device. In one application, a security officer at a port may need to inspect or otherwise or view a person passing through a radiation detection system while listening to the audible sounds. For example, the security officer may observe the person while the sounds are being made, so that the security office may be able to correlate the sound they hear with a particular radioactive species without the need for the security officer to move his or her eyes away from the person. Thus, the security officer can watch the person for suspicious behavior at the same time the security officer receives information regarding potential radioactive species within or carried by that person. In similar applications, a security office can similarly listen for audible information while baggage or packages are processed at a port, such as an airport, a rail station, a truck terminal, a marine loading dock, or the like.

In another application, a geophysicist or other technical personnel may be using a radiation detection system near a geological formation. The geophysicist or other technical personnel may be able to evaluate geological formations by listening to the sounds, rather than having to frequency check a display device. Further, the geophysicist or other technical personnel may be examining geological formations in rugged terrain. The use of particular radiation detection systems and methods as described herein can aid in safety, as more visual attention can be addressed to the terrain while radiation information is perceived by hearing.

Further, particular embodiments of radiation detection systems and methods as described herein can provide much richer information as compared to a conventional radiation detection system. For example, U.S. Pat. No. 5,231,288 discloses a radiation detection system that outputs only limited audible information. More particularly, different chords can be produced for different radioactive species within a list. The loudness of the chord increases with a higher number of counts. The radiation detection system is limited in many respects. The disclosed radiation detection system plays a dissonant chord when a peak is detected that does not correspond to a radioactive species within the list. If the same dissonant chord is played for different peaks not corresponding to a radioactive species within the list, the user may not hear complete information. Referring to FIG. 16, the two unknown peaks may be output as the same dissonant chord even though the user would not know if there are two peaks to an unknown single radioactive species or different radioactive species. In contrast, an embodiment as disclosed herein can hear sounds at different audible frequencies, and therefore, different radioactive species will be perceived as the different sounds.

Still further, U.S. Pat. No. 5,231,288 does not disclose making any audible sounds where a peak is not detected. In particular embodiments as disclosed herein, sounds within an audible spectrum can be played as a scan, and thus the lack of radioactive species at particular energy levels can be more affirmatively determined. Thus, the user can perceive significantly more complete information.

Many different aspects and embodiments are possible. Some of those aspects and embodiments are described below. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

In a first aspect, a radiation detection system can include a radiation detector and an audio output device. The radiation detector can detect radiation, wherein the radiation corresponds to radiation information including energy information and energy intensity information. The audio output device can produce an audio spectrum in a scanning mode. Audible frequencies within the audio spectrum can correspond to energy levels within the energy information, and audible intensities within the audio spectrum can correspond to energy intensities within the energy intensity information. The audio spectrum can includes particular sounds at particular audible frequencies corresponding to particular energy levels that are spaced apart from known energy levels of predetermined radioactive species. The particular audible frequencies can be different from each other.

In an embodiment of the first aspect, the radiation detection system further includes a mapping module to map the energy levels to the audible frequencies. In a particular embodiment, the audible frequencies are proportional to the energy levels. In another embodiment, the audible intensities include amplitudes corresponding to energy intensities. In still another embodiment, the audio spectrum includes a range of audible frequencies of at least approximately 100 Hz to no more than approximately 5000 Hz. In a particular embodiment, the audio output device is configured to play sounds while scanning the audio spectrum at a rate of no less than approximately 1 Hz/second, no less than approximately 10 Hz/second, or no less than approximately 100 Hz/second.

In a further embodiment of the first aspect, the energy levels are energy segments, wherein each energy segment has a width of at least approximately 10 keV, and the energy segments have different audible frequencies as compared to each other. In a particular embodiment, each of the energy segments has a width in a range of approximately 100 keV to approximately 500 keV. In another particular embodiment, the energy segments include at least approximately 8 energy segments or no more than approximately 32 energy segments. In still another particular embodiment, the energy segments are contiguous energy segments. In still a further embodiment, the radiation detection system further includes an analyzer coupled to the radiation detector, wherein the analyzer is configured to analyze a signal from the radiation detector and generate the radiation information. In a particular embodiment, the analyzer is a multi-channel analyzer. In a more particular embodiment, the multi-channel analyzer includes approximately 256 channels to approximately 8200 channels.

In an embodiment of the first aspect, the radiation detection system further includes a filter configured to filter the radiation information or audio information. In a particular embodiment, the filter is configured to use a smoothing function. In a more particular embodiment, the smoothing function includes to subtracting background radiation information from the radiation information obtained from an object. In another particular embodiment, the filter is configured to use a normalizing function. In still another particular embodiment, the filter is configured to use a logarithmic scale regarding the energy intensities or audible intensities. In another embodiment, the radiation detector is configured to detect ionizing radiation. In still another embodiment, the radiation detection system further includes a selector that is operable to switch the radiation detection system to an amplitude mode or to a repetition mode. In yet another embodiment, the energy information includes an energy spectrum from at least from approximately 0 keV to no greater than approximately 10 MeV. In a further embodiment, the energy information includes an energy spectrum no greater than approximately 3 MeV.

In a second aspect, a radiation detection system can include a radiation detector and an audio output device. The radiation detector can detect radiation, wherein the radiation corresponds to radiation information including energy information and energy intensity information. The audio output device can produce sounds at corresponding sound repetition rates, wherein the sounds correspond to particular energy levels within the energy information, wherein a sound includes an audible frequency that is different from another audible frequency of another sound, and the sound repetition rates correspond to particular energy intensities within the energy intensity information.

In an embodiment of the second aspect, the radiation detection system further includes a mapping module to map the particular energy levels to the audible frequencies. In another embodiment, the audible frequencies are proportional to the particular energy levels. In still another embodiment, the audible intensities include amplitudes corresponding to particular energy intensities. In yet another embodiment, the audio spectrum includes a range of audible frequencies of at least approximately 100 Hz to no more than approximately 5000 Hz. In a particular embodiment, the sound repetition rate is no less than approximately 1 sound/10 minutes, no less than approximately 1 sound/minute, or no greater than approximately 10 sounds/second.

In a further embodiment of the second aspect, the particular energy levels are energy segments, wherein each particular energy segment has a width of at least approximately 10 keV wide, and the energy segments have different audible frequencies as compared to each other. In a particular embodiment, each of the energy segments has a width in a range of approximately 100 keV to approximately 500 keV. In another particular embodiment, the energy segments include at least approximately 8 energy segments or no more than approximately 32 energy segments. In still another embodiment, the energy segments are contiguous energy segments. In yet a further embodiment, the radiation detection system further includes an analyzer coupled to the radiation detector, wherein the analyzer is configured to analyze a signal from the radiation detector and generate the radiation information. In a particular embodiment, the analyzer is a multi-channel analyzer. In a more particular embodiment, the multi-channel analyzer includes approximately 256 channels to approximately 8200 channels.

In an embodiment of the second aspect, the radiation detection system further includes a filter configured to filter the radiation information or audio information. In a particular embodiment, the filter is configured to use a smoothing function. In a more particular embodiment, the smoothing function corresponds to subtracting background radiation information from the radiation information obtained from an object. In another particular embodiment, the filter is configured to use a normalizing function. In still another particular embodiment, the filter is configured to use a logarithmic scale regarding the energy intensities or audible intensities. In another embodiment, the radiation detector is configured to detect ionizing radiation. In a particular embodiment, the radiation detector includes a scintillator and a photosensor. In still another embodiment, the energy information includes an energy spectrum from at least from approximately 0 keV to no greater than approximately 10 MeV. In a further embodiment, the energy information includes an energy spectrum no greater than approximately 3 MeV.

In a third aspect, a method of using a radiation detection system can include placing an object near a radiation detector, generating a radiation signal corresponding to radiation emitted from the object, and analyzing the radiation signal to generate radiation information including energy information and energy intensity information. The method can also include filtering the radiation information to produce filtered radiation information, and outputting sounds corresponding to the filtered radiation information.

In an embodiment of the third aspect, filtering the radiation information includes filtering out energy values no greater than approximately 500 keV, no greater than approximately 400 keV, or no greater than approximately 300 keV. In another embodiment, filtering includes using a smoothing function. In a more particular embodiment, filtering includes subtracting background radiation information from the radiation information corresponding to the object. In still another embodiment, filtering includes using a normalizing function or using a logarithmic scale regarding energy intensities within the energy intensity information. In yet another embodiment, analyzing includes assigning energy values to particular energy segments. In a particular embodiment, each of the energy segments has a width of at least 10 keV wide. In still another particular embodiment, each of the energy segments has a width in a range of approximately 100 keV to approximately 500 keV. In a yet another particular embodiment, the energy segments include at least approximately 8 energy segments or no more than approximately 32 energy segments. In another particular embodiment, the energy segments are contiguous energy segments.

In a further embodiment of the third aspect, the method further includes mapping energy levels within the energy information to audible frequencies. In still a further embodiment, outputting the sounds includes outputting a first sound at a first audible intensity that corresponds to a first energy intensity within the energy intensity information, and outputting a second sound at a second audible intensity that corresponds to a second energy intensity within the energy intensity information. The first energy intensity is different from the second energy intensity, and the first audible intensity is different from the second audible intensity. In a particular embodiment, mapping includes mapping a first energy level within the energy information to a first audible frequency, and mapping a second energy level within the energy information to a second audible frequency. The first energy level is less than the second energy level, and the first audible frequency is less than the second audible frequency. Alternatively, the first energy level is less than the second energy level, and the first audible frequency is higher than the second audible frequency. In another particular embodiment, first and second audible intensities correspond to different amplitudes for the first and second sounds. In still another particular embodiment, the first and second audible intensities correspond to different sound repetition rates. In a more particular embodiment, the sound repetition rates are no less than approximately 1 sound/10 minutes, no less than approximately 1 sound/minute, or no greater than approximately 10 sounds/second.

In another embodiment of the third aspect, outputting the sounds includes outputting the sounds in a range of audible frequencies of at least approximately 100 Hz to no more than approximately 5000 Hz. In still another embodiment, the radiation includes ionizing radiation. In yet another embodiment, the method further includes selecting an audible output mode to an amplitude mode or to a repetition mode. In a further embodiment, the energy information includes an energy spectrum from at least from approximately 0 keV to no greater than approximately 10 MeV. In another embodiment, the energy information includes an energy spectrum no greater than approximately 3 MeV.

Note that not all of the activities described above in the general description or the examples are required, that a portion of a specific activity may not be required, and that one or more further activities may be performed in addition to those described. Still further, the order in which activities are listed is not necessarily the order in which they are performed.

In a particular embodiment, a method may be described in a series of sequential actions. The sequence of the actions and the party performing the actions may be changed without necessarily departing from the scope of the teachings unless explicitly stated to the contrary. Actions may be added, deleted, or altered. Also, a particular action may be iterated. Further, actions within a method that are disclosed as being performed in parallel may be performed serially, and other actions within a method that are disclosed as being performed serially may be performed in parallel.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detection system comprising:
   a radiation detector to detect radiation, wherein the radiation corresponds to radiation information including energy information and energy intensity information; and
   an audio output device to produce an audio spectrum in a scanning mode,
   wherein:
      audible frequencies within the audio spectrum correspond to energy levels within the energy information, and audible intensities within the audio spectrum correspond to energy intensities within the energy intensity information;
      the audio spectrum includes particular sounds at particular audible frequencies corresponding to particular energy levels that are spaced apart from known energy levels of predetermined radioactive species; and
      the particular audible frequencies are different from each other.

2. The radiation detection system of claim 1, further comprising a mapping module to map the energy levels to the audible frequencies.

3. The radiation detection system of claim 1, wherein the audible intensities include amplitudes corresponding to energy intensities.

4. The radiation detection system of claim 1, wherein the audio output device is configured to play sounds while scanning the audio spectrum at a rate of no less than approximately 1 Hz/second.

5. The radiation detection system of claim 1, further comprising a filter configured to filter the radiation information or audio information.

6. The radiation detection system of claim 5, wherein the filter is configured to use a smoothing function.

7. The radiation detection system of claim 6, wherein the smoothing function includes subtracting a background radiation information from the radiation information obtained from an object.

8. The radiation detection system of claim 5, wherein the filter is configured to use a normalizing function.

9. The radiation detection system of claim 1, wherein the audio output device is configured such that different unknown radioactive species are perceived as the different sounds.

10. A radiation detection system comprising:
a radiation detector to detect radiation, wherein the radiation corresponds to radiation information including energy information and energy intensity information; and
an audio output device to produce sounds at corresponding sound repetition rates, wherein:
the sounds correspond to particular energy levels within the energy information, wherein a sound includes an audible frequency that is different from another audible frequency of another sound; and
the sound repetition rates correspond to particular energy intensities within the energy intensity information.

11. The radiation detection system of claim 10, wherein the sound repetition rate is no less than approximately 1 sound/10 minutes.

12. The radiation detection system of claim 10, wherein the sound repetition rate is no greater than approximately 10 sounds/second.

13. A method of using a radiation detection system comprising:
providing a radiation detection system comprising:
a radiation detector to detect radiation, wherein the radiation corresponds to radiation information including energy information and energy intensity information; and
an audio output device to produce sounds at corresponding sound repetition rates, wherein:
the sounds corresponding to particular energy levels within the energy information, wherein a sound includes an audible frequency that is different from another audible frequency of another sound; and
the sound repetition rates correspond to particular energy intensities within the energy intensity information;
placing an object near the radiation detector;
generating a radiation signal corresponding to radiation emitted from the object;
analyzing the radiation signal to generate radiation information including energy information and energy intensity information, wherein the energy information includes substantially contiguous energy segments that are assigned to bins;
filtering the radiation information to produce filtered radiation information; and
outputting sounds corresponding to the filtered radiation information, wherein the sounds correspond to the bins.

14. The method of claim 13, wherein filtering the radiation information comprises filtering out energy values no greater than approximately 500 keV.

15. The method of claim 13, wherein filtering comprises using a smoothing function.

16. The method of claim 15, wherein filtering comprises subtracting a background radiation information from the radiation information corresponding to the object.

17. The method of claim 13, wherein filtering comprises using a normalizing function.

18. The method of claim 13, wherein filtering comprises using a logarithmic scale regarding energy intensities within the energy intensity information.

19. The method of claim 13, wherein outputting the sounds comprises:
outputting a first sound at a first audible intensity that corresponds to a first energy intensity within the energy intensity information; and
outputting a second sound at a second audible intensity that corresponds to a second energy intensity within the energy intensity information,
wherein the first energy intensity is different from the second energy intensity, and the first audible intensity is different from the second audible intensity.

20. The method of claim 19, wherein the first and second audible intensities correspond to different sound repetition rates.

* * * * *